(12) United States Patent  
Anderson

(10) Patent No.: US 7,514,630 B2  
(45) Date of Patent: Apr. 7, 2009

(54) REMOVABLE HARNESS FOR DISENTANGLING WIRES

(76) Inventor: Gary Anderson, 810 Valley Crest Dr., Vista, CA (US) 92084

( * ) Notice: Subject to any disclaimer, the term of this patent is extended or adjusted under 35 U.S.C. 154(b) by 0 days.

(21) Appl. No.: 11/859,393

(22) Filed: Sep. 21, 2007

(65) Prior Publication Data

US 2008/0087465 A1  Apr. 17, 2008

Related U.S. Application Data

(60) Provisional application No. 60/829,124, filed on Oct. 11, 2006.

(51) Int. Cl.  
*H02G 3/04* (2006.01)

(52) U.S. Cl. .............. 174/72 A; 174/480; 174/481; 174/68.1; 174/135; 174/72 C; 52/220.1

(58) Field of Classification Search .......... 174/480, 174/481, 72 A, 72 C, 68.1, 68.3, 135, 95, 174/96, 97; 439/207, 211; 52/220.1, 220.5; 385/100, 134

See application file for complete search history.

(56) References Cited

U.S. PATENT DOCUMENTS

| | | | | |
|---|---|---|---|---|
| 3,786,171 A | * | 1/1974 | Shira | 174/504 |
| 3,890,459 A | * | 6/1975 | Caveney | 174/101 |
| 3,968,322 A | * | 7/1976 | Taylor | 174/72 A |
| 4,082,086 A | | 4/1978 | Page et al. | |
| 4,233,987 A | | 11/1980 | Feingold | |
| 4,328,814 A | | 5/1982 | Arkans | |
| 4,350,842 A | * | 9/1982 | Nolf | 174/92 |
| 4,353,372 A | | 10/1982 | Ayer | |
| 4,573,474 A | | 3/1986 | Scibetta | |
| 4,629,826 A | * | 12/1986 | Thomas | 174/99 R |
| 4,653,155 A | | 3/1987 | Hara | |
| 4,854,323 A | | 8/1989 | Rubin | |
| 4,954,085 A | | 9/1990 | Inoue et al. | |
| 5,037,131 A | | 8/1991 | Kuramoto et al. | |
| 5,184,620 A | | 2/1993 | Cudahy et al. | |
| 5,191,886 A | | 3/1993 | Paeth et al. | |
| 5,341,806 A | | 8/1994 | Gadsby et al. | |
| 5,490,595 A | | 2/1996 | Sakai et al. | |
| 6,184,474 B1 | * | 2/2001 | Craft, Jr. | 174/135 |
| 6,972,367 B2 | * | 12/2005 | Federspiel et al. | 174/481 |

\* cited by examiner

*Primary Examiner*—Dhiru R Patel

(57) ABSTRACT

A wire harness for quickly disentangling wires, made of rigid low friction material comprising a top bar equipped in its center with a first vertical cylindrical opening; a bottom bar equipped in its center with a second vertical cylindrical opening co-axial with the first vertical opening; an axle traversing the first opening and the second opening thereby rotatably connecting the top part to the bottom bar. In addition, the bottom bar is equipped on its top face with grooves large enough to accommodate wires of a predetermined size. The top bar can be rotated at ninety degrees with respect to the bottom bar thereby allowing the insertion into the grooves of the wires. The top bar can be rotated parallel to the bottom bar, thereby allowing the locking in place of the wires. The harness can be slid up and down the wires thereby disentangling the wires.

11 Claims, 10 Drawing Sheets

REMOVABLE HARNESS FOR DISENTANGLING WIRES

This invention claims the benefit of U.S. Provisional Application No. 60/829,124 with the title, "Removable Harness for Disentangling Wires" filed on Oct. 11, 2006 and which is hereby incorporated by reference. Applicant claims priority pursuant to 35 U.S.C. Par 119(e)(i). The present invention relates to electric wire harnesses, more particularly to harnesses designed specially for electrocardiograms.

FIELD OF THE INVENTION

Background

Electrical devices such as electrocardiograms, equipped with an array of wires, often need to be deployed in haste and in stressful environments. First aid personnel, for example, must deploy electrocardiogram machines in the field very quickly, sometimes in difficult conditions. Under these conditions, in which every second counts, wires tend to get tangled causing loss of precious time.

Some but not all electrocardiograms carry with their wire arrays their own harnesses. These harnesses are statically mounted on the wires and are made of rubbery material. Because of the softness of the material and its high coefficient of friction, these harnesses are not easy to slide up and down the wires for the purpose of untangling the wires. They are intended to reduce the length of wire which can get tangled. In addition the small size of these harnesses makes them difficult to handle. While they are suitable for a clinical environment in which electrocardiogram machines are more or less permanently deployed and the wires do not need to be quickly untangled, these harnesses are inadequate for field operation where the wires are usually stored in a coiled configuration.

U.S. Pat. No. 4,854,323 describes a tubular harness for holding the wires of an electrocardiogram machine. This harness however, restricts the user to applying the electrodes along a curvilinear locus. In addition, the harness, because of its tubular nature is voluminous and difficult to install or remove from the electrocardiogram machine.

There is a need, especially on the part of first aid workers, for a simple yet effective implement for quickly disentangling the wires of an electrocardiogram machine from a stored coiled configuration. This implement should be easily mounted and dismounted on the wire array, should be made of rigid, low friction material and should be large enough to be easily grasped by one hand and effortlessly slid up and down the wires.

Further features, aspects, and advantages of the present invention over the prior art will be more fully understood when considered with respect to the following detailed description claims and accompanying drawings.

SUMMARY OF THE INVENTION

This invention is a wire harness for quickly disentangling wires, made of rigid low friction material. It comprises a top bar equipped in its center with a first vertical cylindrical opening; a bottom bar equipped in its center with a second vertical cylindrical opening co-axial with the first vertical opening; an axle traversing the first opening and the second opening thereby rotatably connecting the top part to the bottom bar. In addition, the bottom bar is equipped on its top face with grooves large enough to accommodate wires of predetermined size. The top bar can be rotated at ninety degrees with respect to the bottom bar thereby allowing the insertion into the grooves of the wires. The top bar and the bottom bar comprise a snap-lock mechanism that allows them to be locked in place when they are rotated in a parallel configuration. The harness can be slid up and down the wires thereby disentangling the wires.

A variation of the basic design for a wire harness for quickly disentangling wires comprises of atop bar and a bottom bar connected by an axle, wherein the axle traverses the top bar and the bottom bar at one of their ends and the snap-lock mechanism is mounted on the other end.

Another variation comprises a top bar and a bottom bar hinged together at one of their ends such that the top bar can be lifted with respect to the bottom bar thereby allowing the insertion of wires into the grooves in the bottom bar. A snap lock mechanism is placed at the other ends of the bars to allowing the bars to be locked in place.

Yet another version of the invention comprises a bar made of rigid low friction material, which is equipped on its top face with grooves large enough to accommodate the wires. These grooves are U-shaped with their tops narrower than their bottoms. The tops are narrow enough to accommodate the wires snuggly and the bottoms are wide enough to accommodate the wires loosely. This configuration allows the wires to be inserted through the narrow top of the grooves and positioned inside the bottoms of groove, thereby allowing them to be held in place and to be disentangled by being slid up or down the wire harness.

DETAILED DESCRIPTION

Figure 1:
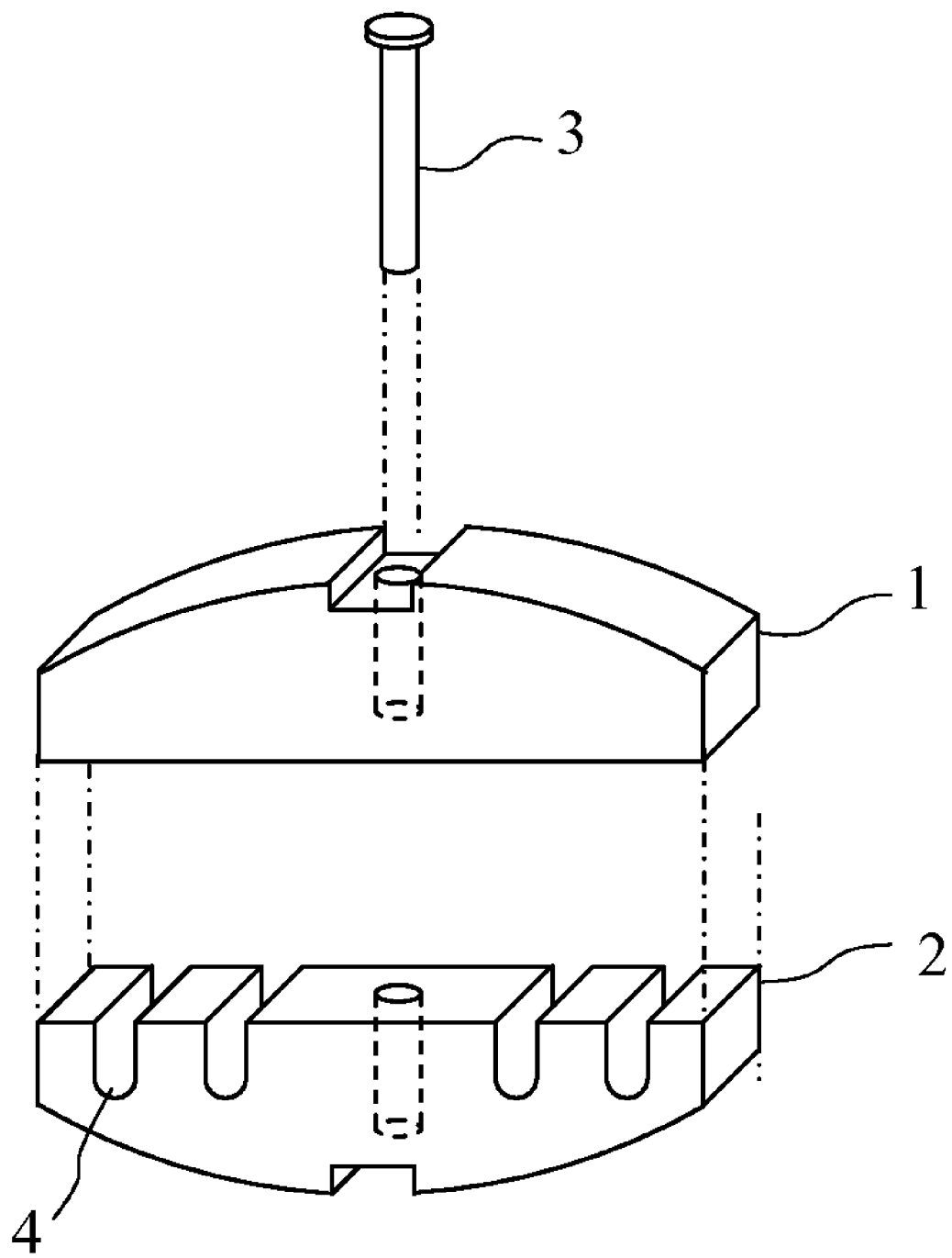
FIG. 1 illustrates an exploded view of the invention.

As shown in FIG. 1 the invention is a wire harness made of rigid low friction plastic that can be used to facilitate the quick disentanglement of wires from a stored coiled configuration as found in electrical machines such as electrocardiograms. It can also be used to untangled wires in electroencephalogram machines, lie detectors and the like. The device shown in an exploded view in FIG. 1 comprises a top bar 1 hinged to a bottom bar 2 by an axle 3 such as a steel rivet. The rivet 3 allows the top bar 1 and bottom bars 2 to be easily rotated with respect to each other.

The bottom bar 1 is equipped with deep U-shaped grooves 4 on its top side which is in contact with the bottom side of the top bar 1. The openings formed by the grooves have a diameter of about ⅛", and are large enough to accommodate wires of an electrocardiogram machine without undue friction or pressure applied to the wires thereby allowing the wires to slide freely through these openings.

Figure 2:
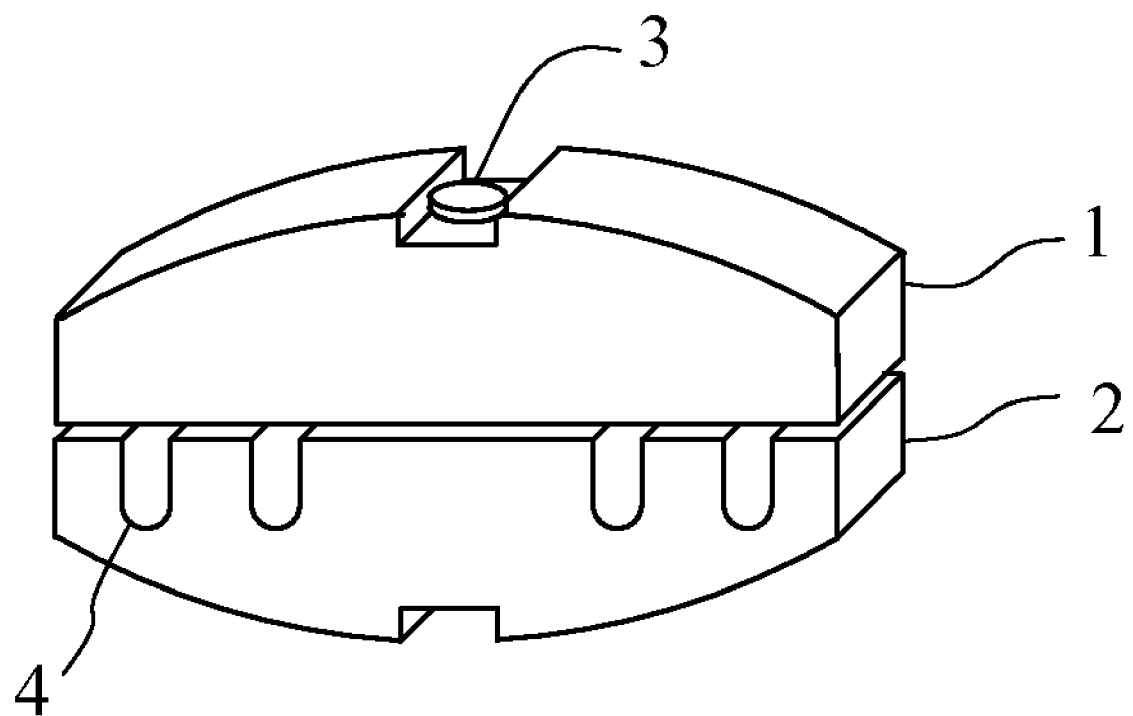
FIG. 2 shows the device in a closed position.
Figure 5:
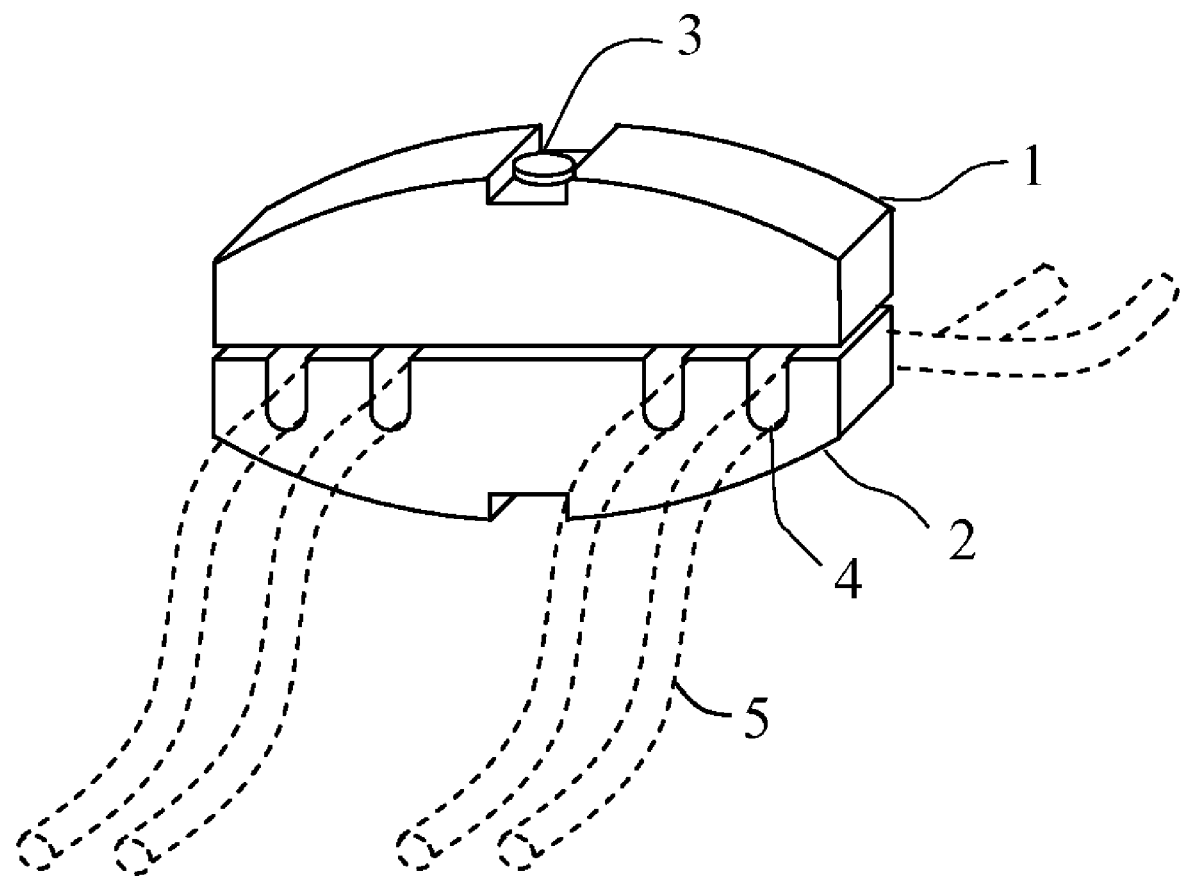
FIG. 5 illustrates the final configuration of the device carrying a full array of wires.

FIG. 2 illustrates the configuration of the device in a closed position before it is used. Mounting the harness onto a set of electrocardiogram wires requires the following actions: 1) As described in FIG. 3, the top bar 1 and the bottom bar are first rotated with respect to each other around the axle 3 to form a perpendicular configuration. 2) The wires are then placed in the grooves 4 of the bottom bar. 3) As described in FIG. 5 the bars are then rotated back into a parallel configuration thus locking the wires in place.

Figure 3:
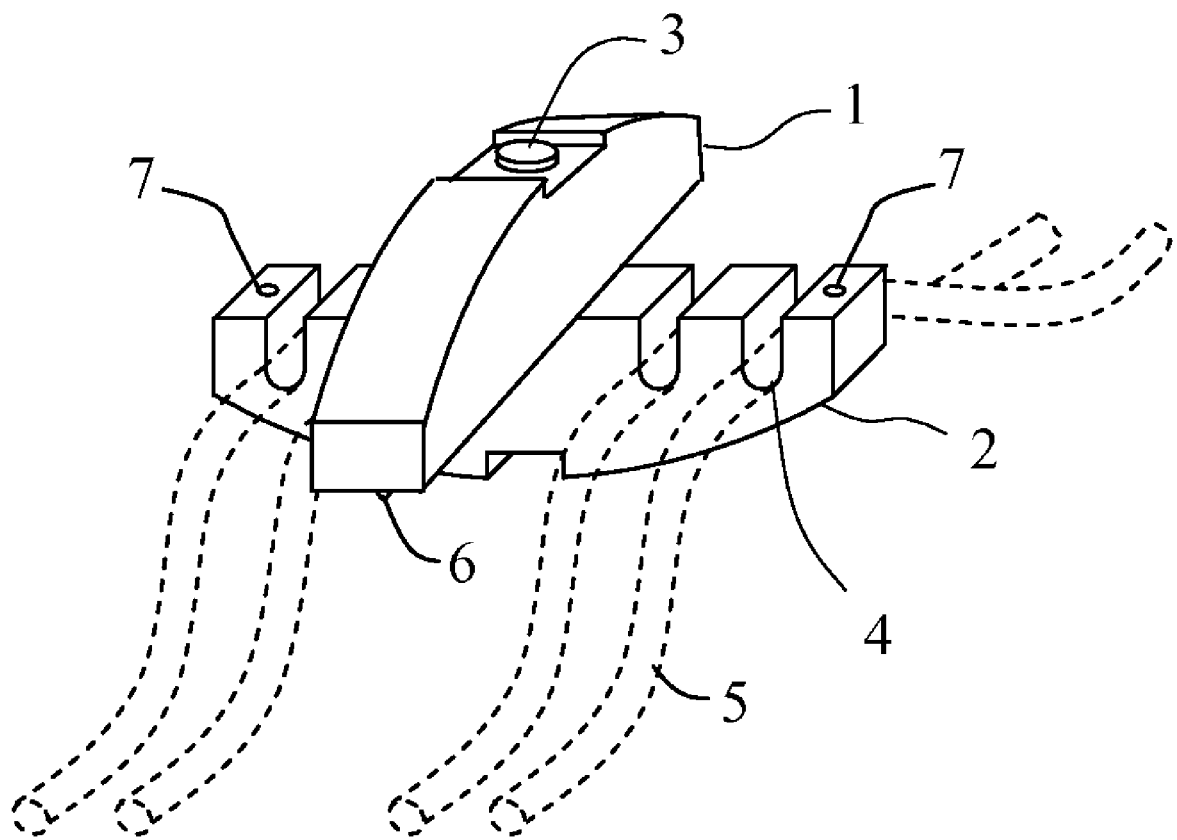
FIG. 3 illustrates how the device can be opened to allow the insertion of wires.
Figure 4:
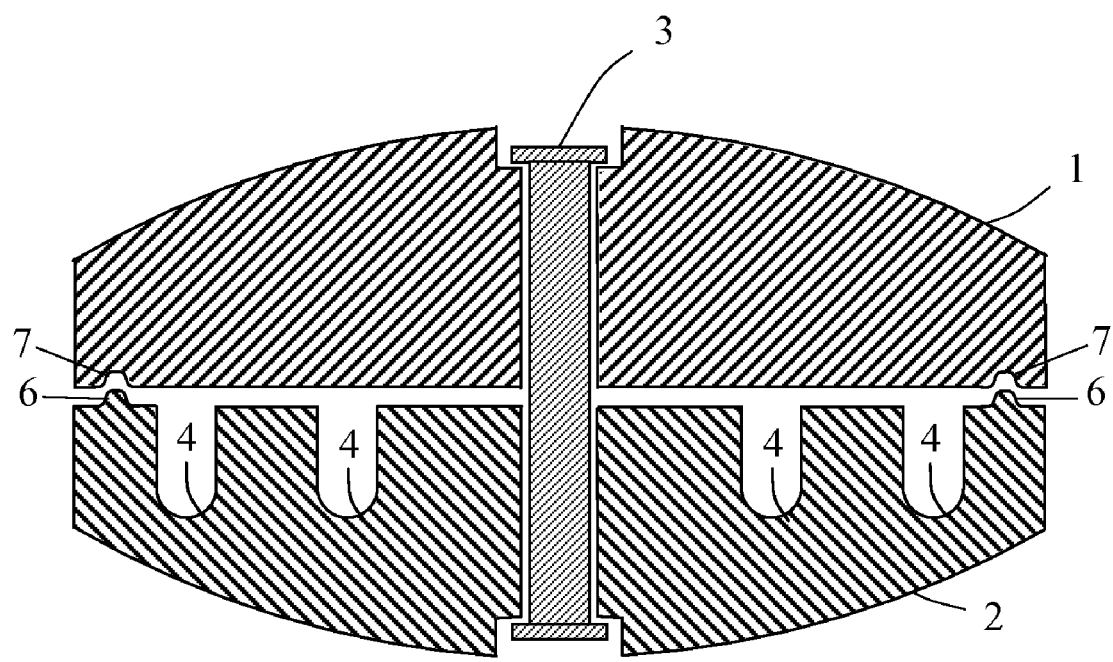
FIG. 4 shows a cross-section of the device. In particular, it shows the lock mechanism allowing the top bar to snap closed with the bottom bar.

A snapping mechanism allows the two bars to stay firmly closed in a parallel configuration. As shown in FIG. 3 and FIG. 4, two protuberances 6 are located on the bottom face of the top bar 1. Two indentations 7 are located on the top face of the bottom bar 2. The protuberances 6 and the indentations 7 face each other such that when the two bars are parallel, they snap together thus allowing the two bars to remain firmly closed.

As an alternative design, it is possible to place a protuberance 6 on the bottom face of the top bar 1 bar and an indentation 7 on the top face of the bottom bar 2. In addition, it is also possible to have a single set of protuberances and indentations located at one end of the bars. Clearly, any state of the art snapping mechanism or locking mechanism that could keep the two bars in place is included in this invention.

The number of grooves 4 in the top bar and in the bottom bar matches the maximum number of wires, typically 6, as used in EKG machines.

The axle 3 used as an axle around which the bars rotate can be a steel rivet or can be any other convenient mechanism. For example the axle 3 could be an extension of the top bar 1 that penetrates the bottom bar 2. If the device is molded in plastic, this approach implies that the axle 3 and the top bar 1 would form a single molded part; the bottom bar 2 would still retain its cylindrical opening. The fit may have to be tight in order for the snaps to engage properly.

Use of the device described in this invention is simple. Some electrocardiogram machines are not equipped with harnesses. And even in those so equipped, the harnesses are small and difficult to handle and are made of rubbery material difficult to slide up and down the wires. The first step, therefore, is to open the device described in this invention by rotating the top bar 1 ninety degrees with respect to the bottom bar 2. The wires are then inserted in the grooves 4. The device is then snapped closed by rotating the top bar 1 to be parallel with the bottom bar 2. The device is then slid up and down the length of the wire array thereby disentangling the wires. The device is slid two times during each use. First, after the wires are taken out of storage, it is slid down the wires keeping them in alignment. After use, the device is slid back up the wires to the starting position. The wires are now ready to be coiled up and stored.

To save time, the device is normally left mounted on the wires between uses. The ease of mounting and dismounting of the device makes it particularly useful in retrofitting existing electrocardiograms equipped with small rubbery harnesses inadequate for sliding, and for retrofitting existing electrocardiogram machines which do not carry any harness at all.

Figure 6:
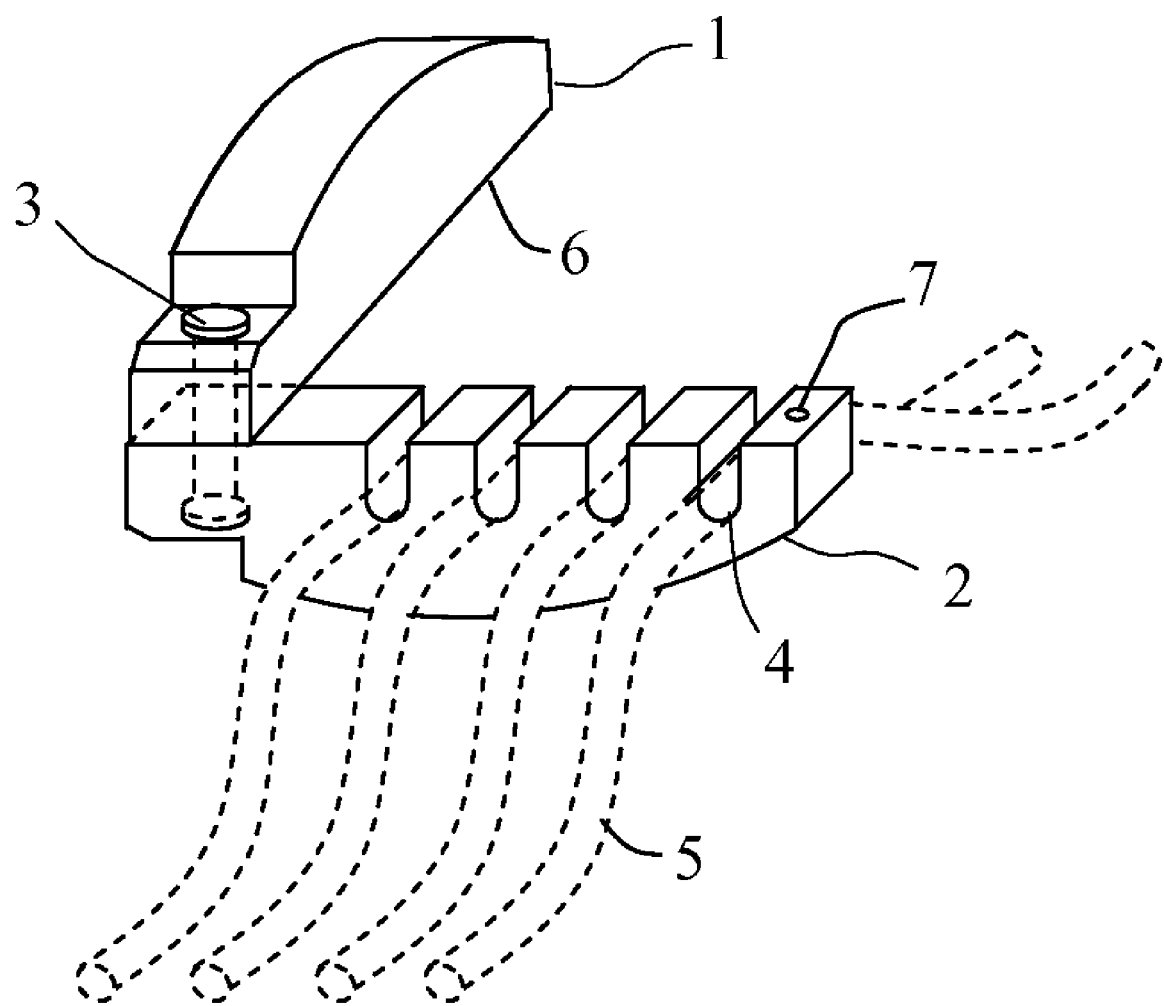
FIG. 6 shows a variation of the basic design with the axle on one of the sides.

A variation of the basic design described above is shown in FIG. 6. Essentially the axle 3 is located on one of the side of the top bar 1 and of the bottom bar 2. The bars are also equipped with a snapping mechanism on the side where the axle is not located to allow them to be locked in place to secure the wires 5. in place. This mechanism consists of a protuberance on one of the bar and an indentation on the other bar.

Figure 6A:
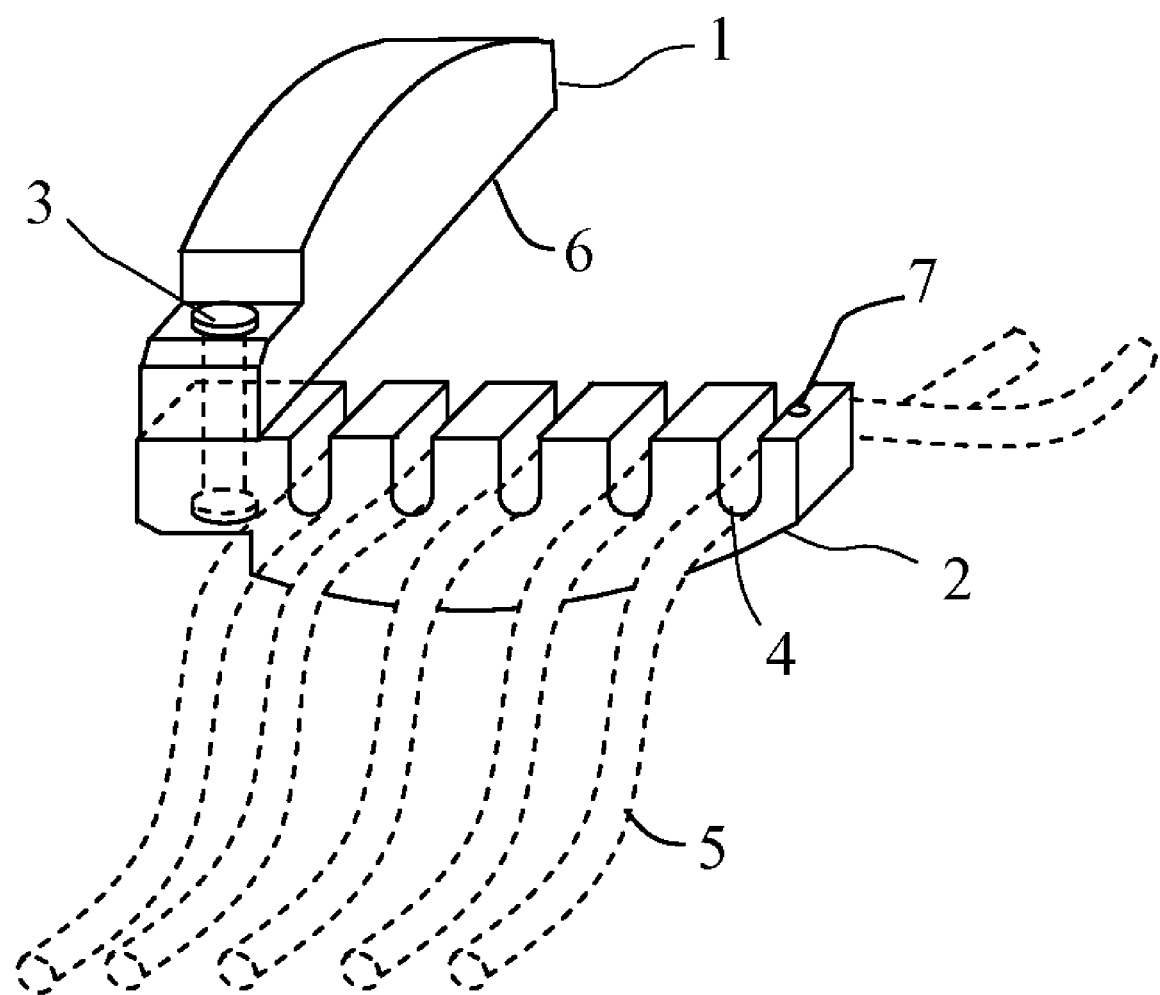
FIG. 6A illustrates a variation showing 5 wires.
Figure 6B:
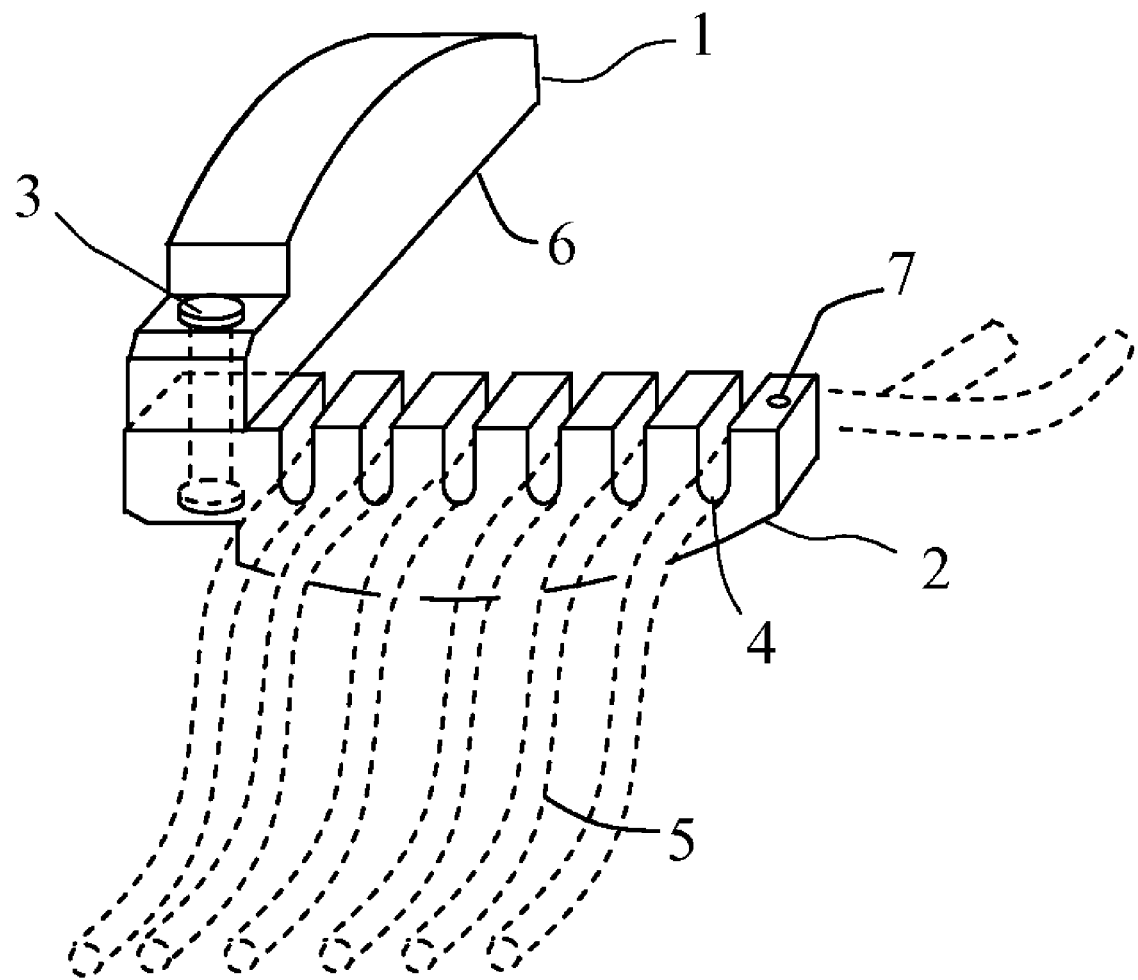
FIG. 6B illustrates a variation showing 6 wires.

As can be shown in FIGS. 6A and 6B this invention can accommodate a range of number of wires. In FIG. 6A the device can support 5 wires and in FIG. 6B, it can hold 6 wires.

Figure 7:
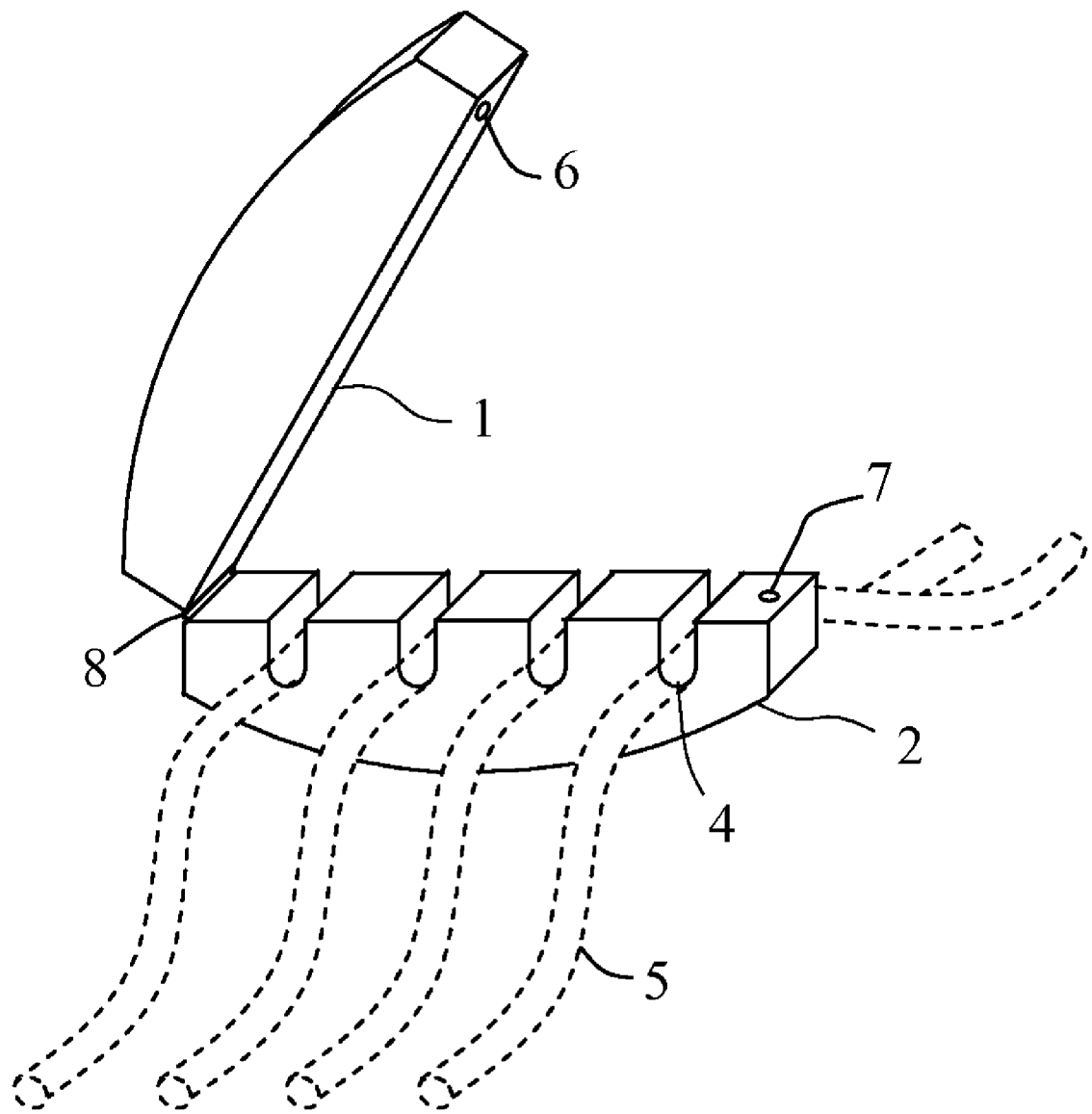
FIG. 7 illustrates another variation of the device with the top bar hinged to the bottom bar.

Yet another variation of the basic design is shown in FIG. 7, in which the top bar 1 is hinged to the bottom bar 2. As those versed in the art, many types of hinges are possible. A possible hinge 8 shown in FIG. 7, called a "living hinge" is formed out of the same material as the top bar and the bottom bar 2 and can most conveniently be manufactured during a plastic molding operation for both top bar 1 and bottom bar 2. The top bar 1 and the bottom bar 2 are equipped with a snap-lock mechanism consisting of a male part 6 on the top bar and a female part 7 on the bottom bar (or vice versa) to allow them to be locked together to secure the wires in place.

Figure 8:
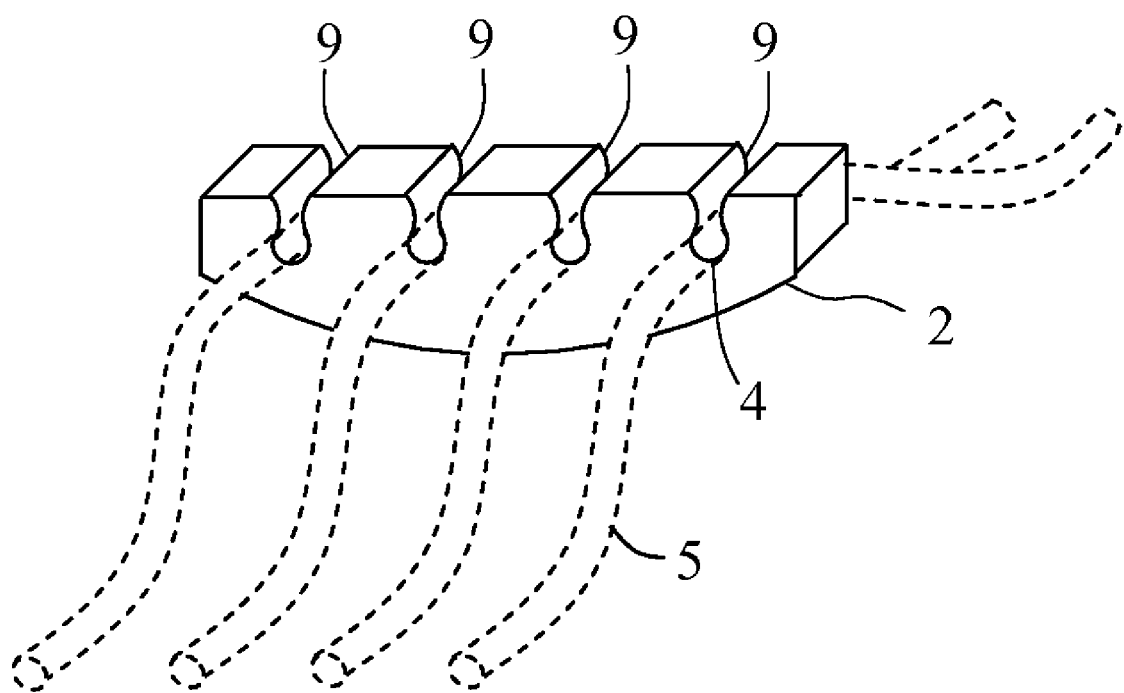
FIG. 8 shows still another variation without a top bar. The wires are held by U-shaped grooves with a narrowing of the grooves near the top of the U.

Yet still another variation is shown in FIG. 8, in which the top bar 1 is eliminated. The wires are held in place in the bottom bar 2 by a narrowing 9 of the U-shaped groves 4 near the top of the U.

While the above description contains many specificities, the reader should not construe these as limitations on the scope of the invention, but merely as exemplifications of preferred embodiments thereof. Those skilled in the art will envision many other possible variations within its scope. Accordingly, the reader is requested to determine the scope of the invention by the appended claims and their legal equivalents, and not by the examples which have been given.

I claim:

1. A wire harness for quickly disentangling wires, made of rigid low friction material comprising:
   a) a top bar equipped with a first vertical cylindrical opening;
   b) a bottom bar equipped with a second vertical cylindrical opening co-axial with said first vertical opening, and in addition, equipped on its top face with grooves large enough to loosely accommodate said wires, said wires having a predetermined size; and
   c) an axle traversing said first opening and said second opening thereby rotatably connecting said top part to said bottom bar, wherein said top bar can be rotated at ninety degrees with respect to said bottom bar thereby allowing the insertion into said grooves of said wires, and furthermore wherein said top bar can be rotated parallel to said bottom bar, thereby allowing the locking in place of said wires and furthermore wherein said harness can be slid up and down said wires.

2. A device as in claim 1 also comprising a snap-lock mechanism comprising at least one indentation mounted on said top bar and at least one protuberance mounted on said bottom bar, said indentation and said protuberance facing each other when said top bar and said bottom bar are in parallel configuration, thereby engaging and snapping into each other.

3. A device as in claim 1 also comprising a snap-lock mechanism comprising at least one indentation mounted on said bottom bar and at least one protuberance mounted on said top bar, said indentation and said protuberance facing each other when said top bar and said bottom bar are in parallel configuration, thereby engaging and snapping into each other.

4. A device as in claim 1 wherein said material is a plastic.

5. A device as in claim 1 wherein said axle is molded with said top bar thereby forming one single piece.

6. A device as in claim 1 wherein said axle is molded with said bottom bar thereby forming one single piece.

7. A device as in claim 1 wherein said axle traverses said top bar and said bottom bar in their center.

8. A device as in claim 1 wherein said axle traverses said top bar and said bottom bar at one of their ends and said snap-lock mechanism is mounted on the other end.

9. A device as in claim 1 that can hold four wires.

10. A device as in claim 1 that can hold five wires.

11. A device as in claim 1 that can hold six wires.

* * * * *